United States Patent
Viswanath et al.

(10) Patent No.: US 6,963,571 B1
(45) Date of Patent: Nov. 8, 2005

(54) SYSTEMS AND METHODS FOR MERGING PACKET LOOKUP RESULTS

(75) Inventors: Somnath Viswanath, San Jose, CA (US); Bahadir Erimli, Campbell, CA (US); Peter Ka-Fai Chow, San Jose, CA (US); Yatin R. Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 847 days.

(21) Appl. No.: 09/797,690

(22) Filed: Mar. 5, 2001

(51) Int. Cl.[7] .......................... H04I 12/28; H04L 12/54
(52) U.S. Cl. ................. 370/395.42; 370/412; 370/418; 370/429
(58) Field of Search .................... 370/412, 413–416, 370/421, 235, 229, 395.21, 390, 231, 395.7, 370/389, 395.1, 395.4, 417, 418, 428, 429; 711/158, 2, 200, 203; 709/240

(56) References Cited

U.S. PATENT DOCUMENTS

| | | | |
|---|---|---|---|
| 4,878,218 A | * | 10/1989 | Takada .................... 370/229 |
| 5,392,286 A | * | 2/1995 | Tanaka et al. ............... 370/231 |
| 5,521,916 A | * | 5/1996 | Choudhury et al. ......... 370/414 |
| 5,654,965 A | * | 8/1997 | Takahashi et al. ........... 370/390 |
| 5,689,500 A | * | 11/1997 | Chiussi et al. .............. 370/235 |
| 5,850,385 A | * | 12/1998 | Esaki ..................... 370/395.21 |
| 5,991,295 A | * | 11/1999 | Tout et al. ................ 370/395.7 |
| 6,643,294 B1 | * | 11/2003 | Cooperman et al. ........ 370/413 |

* cited by examiner

*Primary Examiner*—Alpus H. Hsu
*Assistant Examiner*—Lee Khuong
(74) *Attorney, Agent, or Firm*—Harrity & Snyder, LLP

(57) ABSTRACT

A multiport network device includes output port logic, priority logic, a memory, and memory logic. The output port logic generates output port data that identifies output ports to transmit received packets. The priority logic generates priority data that identifies priorities of the received packets. The memory stores the output port data from the output port logic and the priority data from the priority logic. The memory logic receives priority data relating to one of the received packets from the output port logic, determines whether the memory stores output port data relating to the packet, ignores the received priority data when the memory stores no output port data relating to the packet, and when the memory stores output port data relating to the packet, transmits the received priority data and the stored output port data to the identified output port.

16 Claims, 6 Drawing Sheets

SYSTEMS AND METHODS FOR MERGING PACKET LOOKUP RESULTS

TECHNICAL FIELD

The present invention relates generally to communication systems and methods and, more particularly, to systems and methods for merging packet lookup results.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch or some other network device located between the data path and the stations connected to that path. The switch typically controls the communication of packets and includes logic for receiving and forwarding packets to their appropriate destinations.

In conventional layer 2 or layer 3 switches with multiple output queues, two determinations typically need to be made for every received packet: (1) the port that the packet needs to be transmitted from; and (2) the priority of the packet. Different components in the switch typically make these determinations. The received packet is queued awaiting transmission while the components make their respective determinations.

A problem arises because the component that identifies the output port and the component that determines the priority usually take different amounts of time to make their determinations. This leads to varying amounts of time that the received packet must remain queued prior to transmission. To maintain wire speed, however, the packet queue time should be minimized.

DISCLOSURE OF THE INVENTION

There exists a need for a scheme that merges output port and priority determination results relating to a received packet to reduce the amount of time that the packet is queued in a network switch. This and other needs are met by the present invention, where the throughput rate of the network switch is increased.

Additional advantages and other features of the invention will be set forth in part in the description that follows and in part will become apparent to those having ordinary skill in the art upon examination of the following or may be learned from the practice of the invention. The advantages and features of the invention may be realized and obtained as particularly pointed out in the appended claims.

According to the present invention, the foregoing and other advantages are achieved in part by a multiport network device that includes output port logic, priority logic, a memory, and memory logic. The output port logic generates output port data that identifies output ports to transmit received packets. The priority logic generates priority data that identifies priorities of the received packets. The memory stores the output port data from the output port logic and the priority data from the priority logic. The memory logic receives priority data relating to one of the received packets from the output port logic, determines whether the memory stores output port data relating to the packet, ignores the received priority data when the memory stores no output port data relating to the packet, and when the memory stores output port data relating to the packet, transmits the received priority data and the stored output port data to the identified output port.

In another implementation consistent with the present invention, a method increases throughput in a multiport network device by merging results of priority and output port determinations. The method includes providing a memory configured to store output port data and priority data corresponding to one or more of the packets received at the network device, the output port data identifies an output port of the network device to transmit the corresponding packet, and the priority data identifies a priority of the corresponding packet; receiving output port data relating to a packet received at the network device; determining whether the memory stores priority data relating to the packet; when the memory stores no priority data relating to the packet, sending the received output port data to the identified output port; and when the memory stores priority data relating to the packet, transmitting the received output port data and the stored priority data to the identified output port.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, where elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
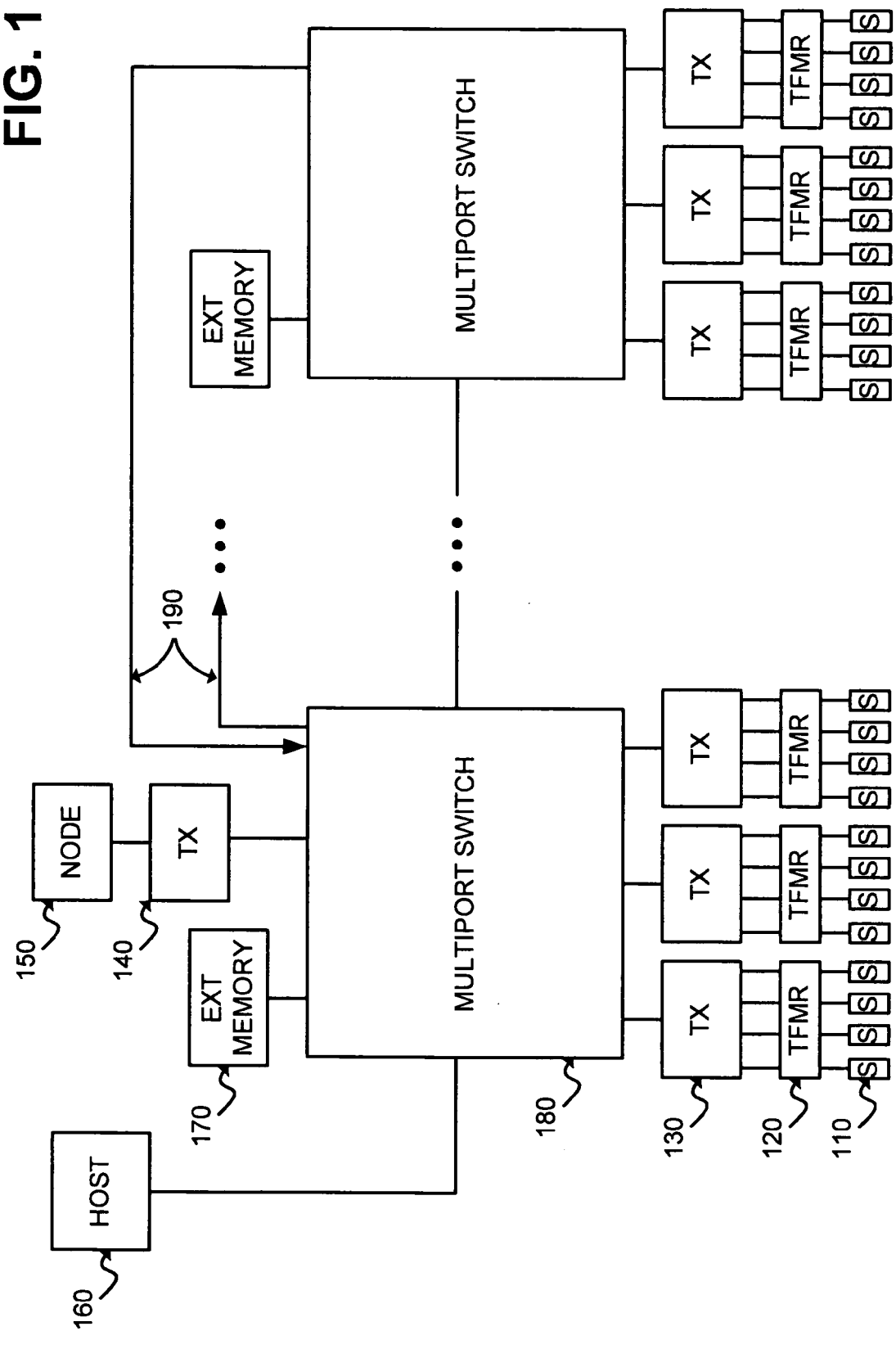
FIG. 1 is a block diagram of an exemplary system in which systems and methods consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
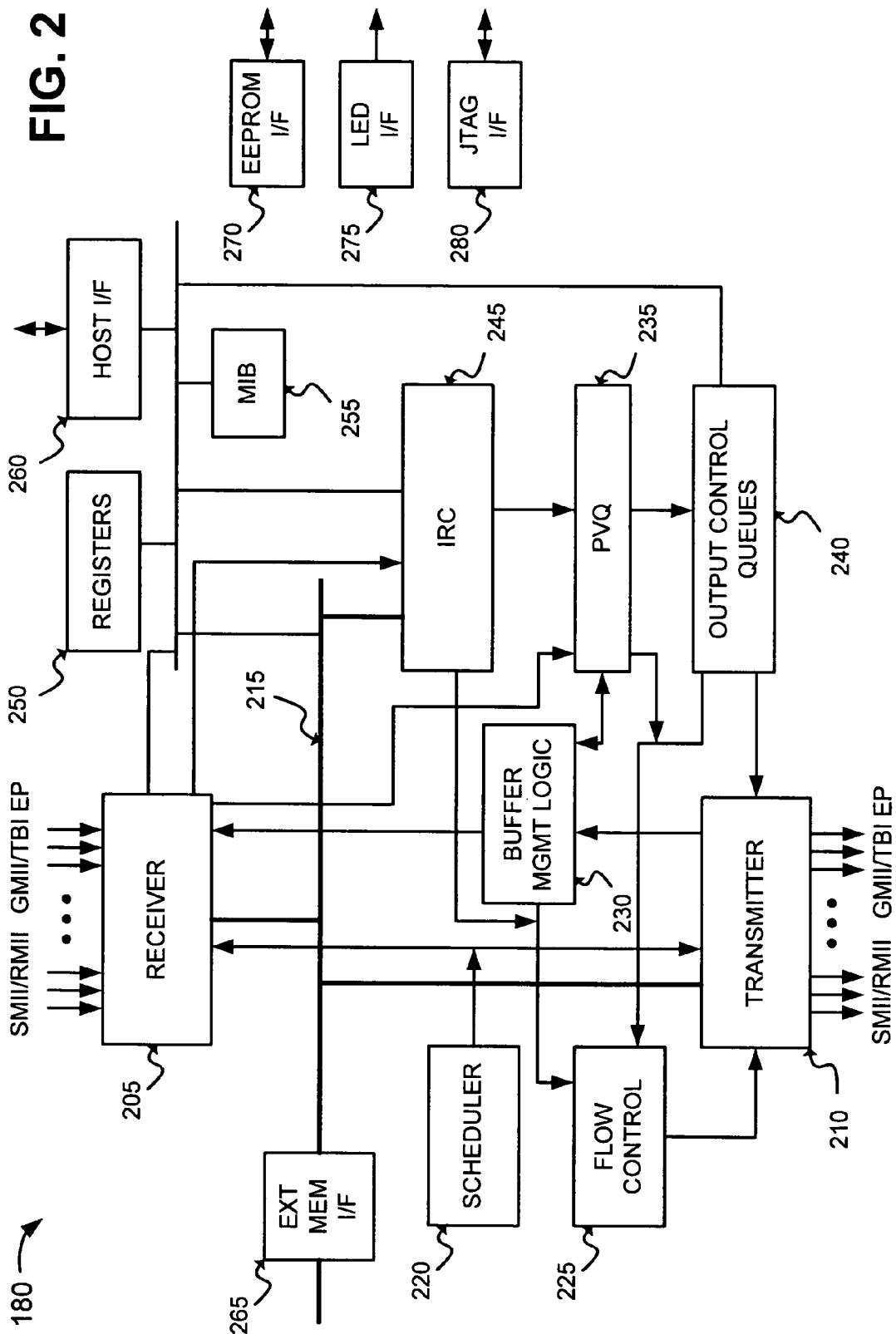
FIG. 2 is a detailed diagram of a multiport switch of FIG. 1 according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

Exemplary PVQ Processing Logic

The present invention is directed to logic that operates upon entries in the PVQ 235 to merge the results of the output port and priority determinations regarding data frames of packets received by the multiport switch 180, thereby increasing the throughput rate of the switch 180.

Figure 3:
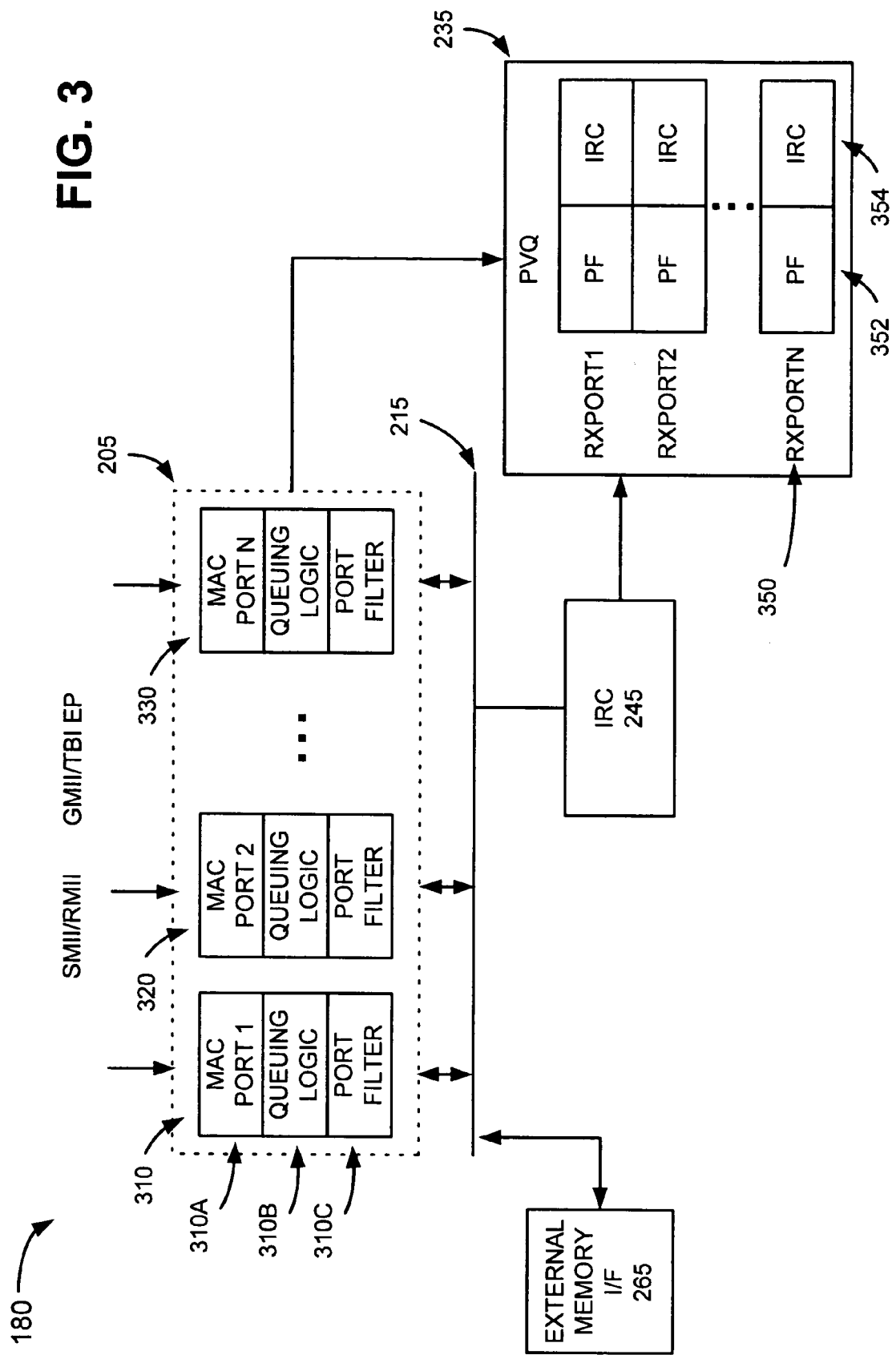
FIG. 3 is a detailed diagram of a portion of the multiport switch of FIG. 2 according to an implementation consistent with the present invention.

FIG. 3 is a detailed diagram of a portion of the multiport switch 180 according to an implementation consistent with the present invention. The portion of the multiport switch 180 shown in FIG. 3 includes the receiver 205, the data bus 215, the PVQ 235, the IRC 245, and the external memory interface 265. The receiver 205 may include MAC modules 310, 320, and 330 corresponding to input ports 1 through N, respectively. Each MAC module may include a receive FIFO buffer, queuing logic, and a port filter. For example, referring to FIG. 3, MAC module 310 may include a receive FIFO buffer 310A, queuing logic 310B, and port filter 310C. The other MAC modules may similarly include receive FIFO buffers, queuing logic, and port filters.

The receive FIFO buffer 310A may include a FIFO that temporarily buffers data frames received on the corresponding input port. The queuing logic 310B may include logic responsible for transferring data frames from the receive FIFO buffer 310A to the external memory 170 (FIG. 1) via the external memory interface 265. The port filter 310C may include logic for determining a priority associated with a received data frame. The port filter 310C may generate its results in the format <PF Tag, PF Frame Pointer> ("tag data") and send the results to the PVQ 235. The PF tag identifies the priority of the data frame and the PF frame pointer identifies the location of the data frame in memory, such as external memory 170.

In an exemplary implementation of the present invention, the port filter 310C categorizes data frames as having either a high priority or a low priority. A high priority data frame may include a data frame that requires lower access latency, such as a data frame destined for a management device or a data frame for a multimedia application. A low priority data frame may include any other data frame. In alternative implementations, the number of priorities associated with the data frame may be greater than two. For example, the multiport switch 180 may identify data frames having one of three levels of priority, such as low, medium and high.

In addition, in some implementations of the present invention, the multiport switch 180 may receive data frames having a priority indication. For example, an Ethernet data frame may include a three-bit field representing one of eight levels of priority. In this case, the port filter 310C on multiport switch 180 may map the received priority information to a corresponding priority level supported by the multiport switch 180. For example, the eight levels of priority may be mapped to either high or low priority on the multiport switch 180. Alternatively, the eight levels of priority associated with the received data frame may be mapped to three or more levels of priority on the multiport switch 180.

As described previously, the IRC 245 determines which output port will output a received data frame. The IRC 245 may determine that a given data frame should be output by either a single port, multiple ports, all ports, or no ports. The IRC 245 may generate its results in the format <IRC Port Vector, IRC Frame Pointer>(IRC data) and send the results to the PVQ 235. The IRC port vector identifies the output port(s) for the data frame and the IRC frame pointer identifies the location of the data frame in memory, such as external memory 170.

The PVQ 235 may include multiple registers 350 corresponding to the MAC modules 310–330 (i.e., the receive ports) and logic for controlling the reading and writing of the registers 350. For example, the PVQ 235 may include one register 350 for each MAC module 310–330. The register 350 may include a port filter buffer 352 and an IRC buffer 354. The port filter buffer 352 may store tag data received from the port filter 310C. The IRC buffer 354 may store IRC data received from the IRC 245.

Figure 4:
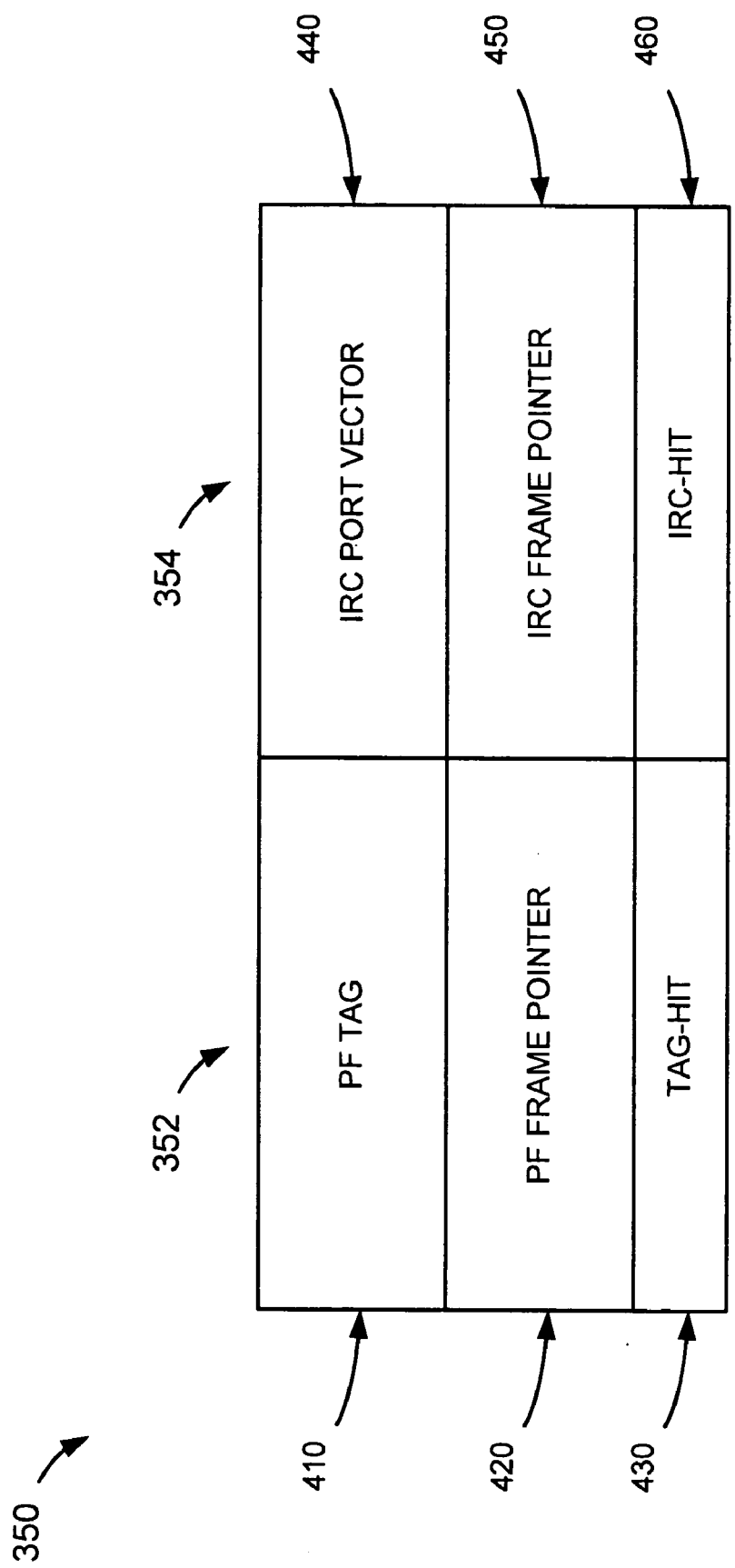
FIG. 4 is an exemplary diagram of a register of the port vector memory of FIG. 3 in an implementation consistent with the present invention.

FIG. 4 is an exemplary diagram of the register 350 according to an implementation consistent with the present invention. As described previously, the register 350 may include the port filter buffer 352 and the IRC buffer 354. The port filter buffer 352 may include a port filter (PF) tag field 410, a PF frame pointer field 420, and a tag-hit field 430. The PF tag field 410 may store priority information for a data frame. The PF frame pointer field 420 may store data that identifies the location of the data frame in external memory 170. The tag-hit field 430 may store data that indicates whether the PF tag field 410 and the PF frame pointer field 420 contain valid data.

The IRC buffer 354 may include an IRC port vector field 440, an IRC frame pointer field 450, and an IRC-hit field 460. The IRC port vector field 440 may store information that identifies an output port for a data frame. The IRC frame pointer field 450 may store data that identifies the location of the data frame in external memory 170. The IRC-hit field 460 may store data that indicates whether the IRC port vector field 440 and the IRC frame pointer field 450 contain valid data.

Exemplary Processing

Figure 5:
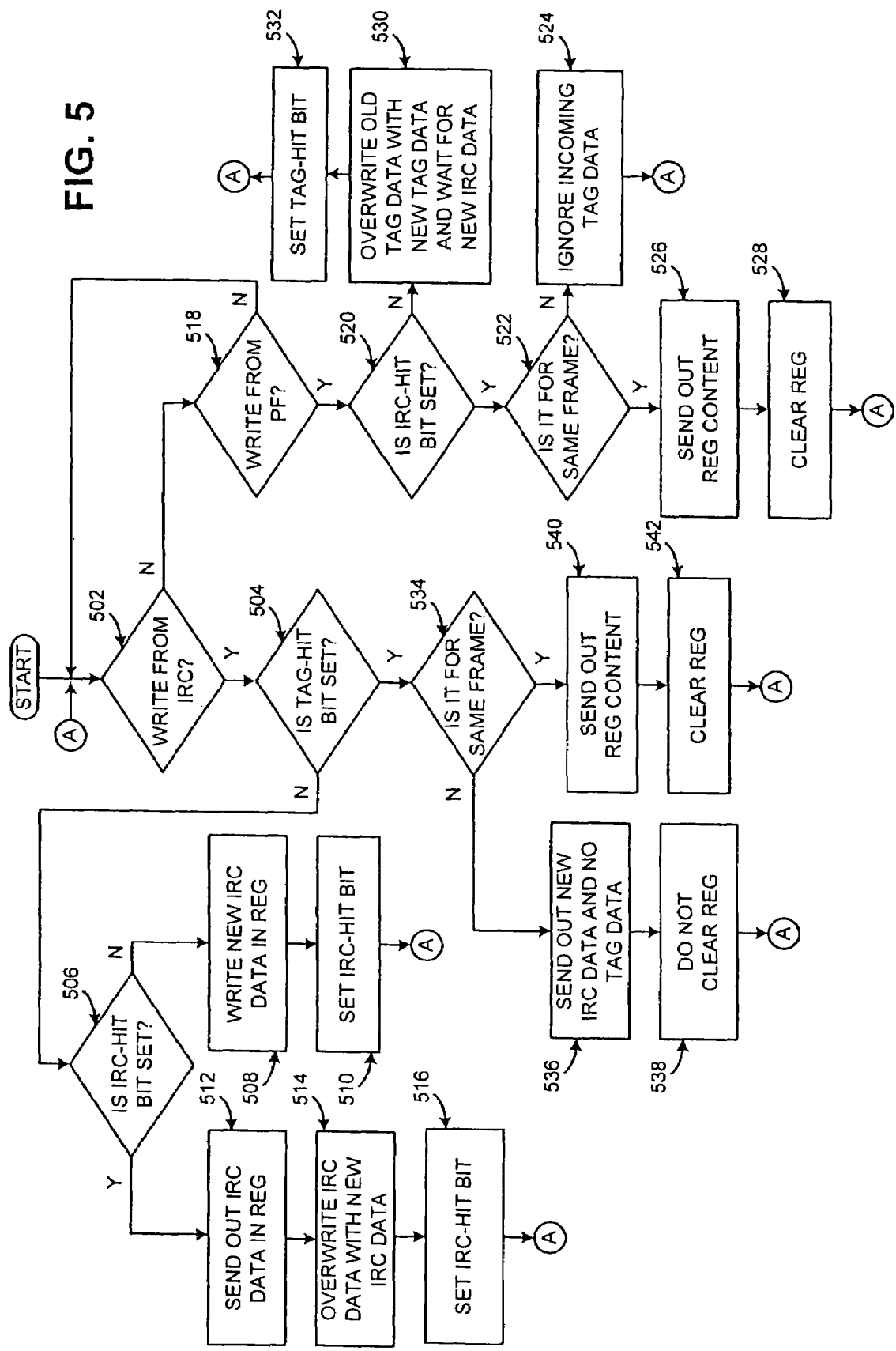
FIG. 5 is a flowchart of exemplary processing for merging results of output port and a priority determinations regarding a packet.

FIG. 5 is a flowchart of exemplary processing for merging results of output port and priority determinations according to an implementation consistent with the present invention. To facilitate the description that follows, assume that the IRC 245 and port filter 310C transmit their information to the PVQ 235 at different times.

Figure 6:
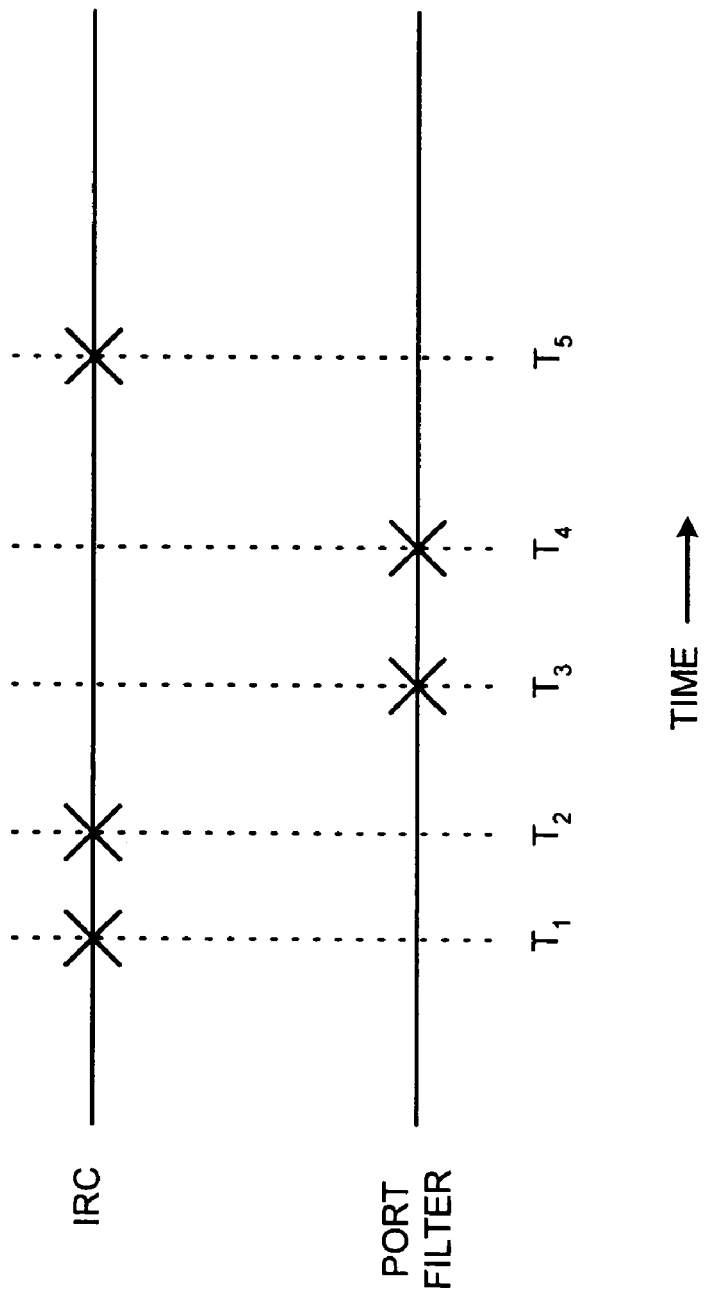
FIG. 6 is an exemplary timeline of transmissions from the IRC and port filter to the PVQ of FIG. 3.

FIG. 6 is an exemplary timeline of transmissions from the IRC 245 and the port filter 310C to the PVQ 235. According to FIG. 6, IRC 245 makes two transmissions at times $T_1$ and $T_2$, followed by two transmissions by the port filter 310C at times $T_3$ and $T_4$, and followed by a transmission by the IRC 245 at time $T_5$. It should be understood that the timeline of FIG. 6 is merely an example timeline for use in describing the processing of FIG. 5.

At time $T_1$, the PVQ 235 receives IRC data from IRC 245 [act 502]. The IRC data may include an IRC port vector and an IRC frame pointer corresponding to a particular output port of the transmitter 210 and a location in external memory 170. The PVQ 235 checks the port filter buffer 352 of the register 350 corresponding to the input port to determine whether the tag-hit bit in the tag-hit field 430 is set [act 504]. Since the port filter buffer 352 is currently empty, the tag-hit bit is not set. In this case, the PVQ 235 determines whether the IRC-hit bit in the IRC-hit field 460 is set [act 506]. Since the IRC buffer 354 of the register 350 is currently empty, the IRC-hit bit is not set. In this case, the PVQ 235 writes the incoming IRC data into the IRC buffer 354 and sets the IRC-hit bit in the IRC-hit field 460 [acts 508 and 510]. Processing may then return to act 502.

At time $T_2$, the PVQ 235 receives new IRC data from IRC 245 [act 502]. The PVQ 235 again checks the port filter buffer 352 of the register 350 corresponding to the input port to determine whether the tag-hit bit in the tag-hit field 430 is set [act 504]. Since the port filter buffer 352 is still empty, the tag-hit bit is not set. In this case, the PVQ 235 determines whether the IRC-hit bit in the IRC-hit field 460 is set [act 506]. The IRC-hit bit was set in act 510. The PVQ 235 may then send the IRC data stored in the IRC buffer 354, but no tag data, to the appropriate output queue in the output control queues 240 [act 512]. The PVQ 235 may then overwrite the IRC data in the IRC buffer 354 with the new IRC data and set the IRC-hit bit in the IRC-hit field 460 [acts 514 and 516]. Processing may then return to act 502.

At time $T_3$, the PVQ 235 receives tag data from the port filter 310C [act 518]. The PVQ 235 may then determine whether the IRC-hit bit is set in the IRC-hit field 460 [act 520]. In this case, the IRC-hit bit was set in act 516. The PVQ 235 may then determine whether the tag data corresponds to the same data frame as the IRC data stored in the IRC buffer 354 [act 522]. The PVQ 235 may make this determination by comparing the PF frame pointer in the tag data and the IRC frame pointer in the IRC frame pointer field 450 in the IRC buffer 354. The frame pointers will be identical for the same data frame.

When the tag data corresponds to a different data frame, the PVQ 235 may ignore the new tag data [act 524] and continue processing at act 502. When the tag data corresponds to the same data frame, however, the PVQ 235 may write the tag data into the port filter buffer 352, send out the contents of the register 350, and then clear the register 350 [acts 526 and 528]. For example, the PVQ 235 may send the contents of the PF tag field 410 and the contents of the IRC port vector field 440 to the appropriate output queue in the output control queues 240 and clear the tag-hit and IRC-hit fields 430 and 460. Processing may then return to act 502.

At time $T_4$, the PVQ 235 receives new tag data from the port filter 310C [act 518]. The PVQ 235 may then determine whether the IRC-hit bit is set in the IRC-hit field 460 [act 520]. Since the register 350 was cleared in act 528, the IRC-hit bit is not set. In this case, the PVQ 235 may overwrite the old tag data with the new tag data and wait for the arrival of new IRC data [act 530]. The PVQ 235 may also set the tag-hit bit in the tag-hit field 430 of the port filter buffer 352 [act 532]. Processing may then return to act 502.

At time $T_5$, the PVQ 235 receives new IRC data from the IRC 245 [act 502]. The PVQ 235 checks the port filter buffer 352 of the register 350 corresponding to the input port to determine whether the tag-hit bit in the tag-hit field 430 is set [act 504]. In this case, the tag-hit bit was set in act 532. The PVQ 235 may then determine whether the new IRC data corresponds to the same data frame as the tag data stored in the port filter buffer 352 [act 534]. The PVQ 235 may make this determination by comparing the IRC frame pointer in the IRC data and the PF frame pointer in the PF frame pointer field 420 in the port filter buffer 352. The frame pointers will be identical for the same data frame.

When the new IRC data corresponds to a different data frame, the PVQ 235 may send out the new IRC data, but no tag data [act 536]. In this case, the PVQ 235 does not clear the register 350 [act 538], but continues processing at act 502. When the IRC data corresponds to the same data frame, however, the PVQ 235 may write the IRC data into the IRC buffer 354, send out the contents of the register 350, and then clear the register 350 [acts 540 and 542]. For example, the PVQ 235 may send the contents of the PF tag field 410 and the contents of the IRC port vector field 440 to the appropriate output queue in the output control queues 240 and clear the tag-hit and IRC-hit fields 430 and 460. Processing may then continue at act 502.

Described has been a system and method for merging output port and priority determination results relating to a packet to reduce the amount of time that the packet remains queued in the multiport switch 180. Advantages of the present invention include maximizing the efficiency and data throughput of the multiport switch 180.

Only the preferred embodiments of the invention and a few examples of its versatility are shown and described in the present disclosure. It is to be understood that the invention is capable of use in various other combinations and environments and is capable of modifications within the scope of the inventive concept as expressed herein. For example, while a series of acts have been described with regard to FIG. 5, the order of the acts may differ in other implementations consistent with the present invention.

What is claimed is:

1. A method for merging results of priority and output port determinations to increase throughput in a multiport network device, comprising:

providing a memory configured to store output port data and priority data corresponding to one or more of a plurality of packets received at the network device, the output port data identifying an output port of the network device to transmit the corresponding packet, the priority data identifying a priority of the corresponding packet;

receiving output port data relating to a packet received at the network device, the output port data including an output port identifier and a first frame pointer;

determining whether the memory stores priority data relating to the packet, the priority data including a priority identifier and a second frame pointer; and when the memory stores priority data relating to the packet, transmitting the received output port data and the stored priority data to an output queue associated with the identified output port, wherein the determining comprises comparing the first frame pointer of the received output port data with the second frame pointer of the stored priority data to determine whether the output port data and the priority data both relate to the same packet.

2. The method of claim 1, wherein the determining includes:

determining whether the memory stores any priority data.

3. The method of claim 1, further comprising:

receiving priority data relating to a second packet;

determining whether the memory stores any output port data; and when the memory stores no output port data, writing the received priority data into the memory.

4. The method of claim 3, wherein when the memory stores output port data, the method further comprises:

determining whether the memory stores output port data relating to the second packet; and when the memory stores output port data relating to the second packet, transmitting the received priority data and the stored output port data to the output queue associated with the identified output port.

5. A method for merging results of priority and output port determinations in a multiport network device, comprising:

providing a memory configured to store output port data and priority data corresponding to one or more of a plurality of packets received at the network device, the output port data identifying an output port of the network device to transmit the corresponding packet, the priority data identifying a priority of the corresponding packet;

receiving output port data relating to a packet received at the network device;

determining whether the memory stores priority data relating to the packet;

when the memory stores no priority data relating to the packet, sending the received output port data to an output queue associated with the identified output port;

when the memory stores priority data relating to the packet, transmitting the received output port data and the stored priority data relating to the packet to the output queue associated with the identified output port, wherein the determining includes:
determining whether the memory stores any priority data and when the memory stores no priority data, the method further comprises:
determining whether the memory stores any output port data;
when the memory stores no output port data, writing the received output port data into the memory; and
when the memory stores output port data, sending the stored output port data to the output queue associated with the identified output port and writing the received output port data into the memory.

6. The method of claim 5, further comprising:
receiving priority data relating to the packet;
determining whether the memory stores output port data relating to the packet; and
when the memory stores output port data relating to the packet, transmitting the stored output port data and the received priority data to the output queue associated with the identified output port.

7. The method of claim 6, further comprising:
ignoring the received priority data when the memory stores no output port data relating to the packet.

8. A method for merging results of priority and output port determinations in a multiport network device, comprising:
providing a memory configured to store output port data and priority data corresponding to one or more of a plurality of packets received at the network device, the output port data identifying an output port of the network device to transmit the corresponding packet, the priority data identifying a priority of the corresponding packet;
receiving output port data relating to a packet received at the network device;
determining whether the memory stores priority data relating to the packet;
when the memory stores no priority data relating to the packet, sending the received output port data to an output queue associated with the identified output port;
when the memory stores priority data relating to the packet, transmitting the received output port data and the stored priority data to the output queue associated with the identified output port;
receiving priority data relating to a second packet;
determining whether the memory stores any output port data;
when the memory stores no output port data, writing the received priority data into the memory;
wherein when the memory stores output port data, the method further comprises:
determining whether the memory stores output port data relating to the second packet;
when the memory stores output port data relating to the second packet, transmitting the received priority data and the stored output port data to the output queue associated with the identified output port; and
when the memory stores no output port data relating to the second packet, ignoring the received priority data.

9. A multiport system, comprising:
output port logic configured to generate output port data that identifies output ports to transmit a plurality of received packets, the output port data including an output port identifier and a first frame pointer;
priority logic configured to generate priority data that identifies priorities of the received packets, the priority data including a priority identifier and a second frame pointer;
a memory configured to store the output port data from the output port logic and the priority data from the priority logic; and
memory logic configured to receive priority data relating to one of the received packets from the output port logic, determine whether the memory stores output port data relating to the one packet, ignore the received priority data when the memory stores no output port data relating to the one packet, and when the memory stores output port data relating to the one packet, transmit the received priority data and the stored output port data to the identified output port, wherein:
when determining whether the memory stores output port data relating to the one packet, the memory logic is configured to compare the first frame pointer of the stored output port data with the second frame pointer of the received priority data.

10. The system of claim 9, wherein when determining whether the memory stores output port data relating to the one packet, the memory logic is configured to determine whether the memory stores any output port data.

11. The system of claim 10, wherein when the memory stores no output port data, the memory logic is configured to write the received priority data into the memory.

12. The system of claim 9, wherein the memory logic is further configured to receive output port data relating to the one packet, determine whether the memory stores priority data relating to the one packet, and when the memory stores priority data relating to the one packet, transmit the stored priority data and the received output port data to the identified output port.

13. The system of claim 12, wherein when the memory stores no priority data relating to the one packet, the memory logic is configured to transmit the received output port data to the identified output port.

14. The system of claim 9, wherein the memory logic is further configured to receive output port data relating to a second one of the received packets, determine whether the memory stores priority data relating to the second packet, and when the memory stores no priority data relating to the second packet, determine whether the memory stores any output port data.

15. The system of claim 14, wherein when the memory stores no output port data, the memory logic is configured to write the received output port data into the memory.

16. The system of claim 14, wherein when the memory stores output port data, the memory logic is configured to send the stored output port data to the identified output port and write the received output port data into the memory.

* * * * *